(12) United States Patent
Hashida

(10) Patent No.: US 7,134,533 B2
(45) Date of Patent: Nov. 14, 2006

(54) COMBINED SERVICE AND PARKING BRAKE APPARATUS

(75) Inventor: Koichi Hashida, Kariya (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 11/302,287

(22) Filed: Dec. 14, 2005

(65) Prior Publication Data
US 2006/0131112 A1    Jun. 22, 2006

(30) Foreign Application Priority Data
Dec. 16, 2004   (JP) ............................. 2004-364160

(51) Int. Cl.
*F16D 55/16* (2006.01)
(52) U.S. Cl. .................. 188/72.8; 188/72.4; 188/106 F
(58) Field of Classification Search ............... 188/72.1, 188/72.4, 72.8, 106 F, 156, 162, 196 D
See application file for complete search history.

(56) References Cited

U.S. PATENT DOCUMENTS

| | | | |
|---|---|---|---|
| 4,215,767 A * | 8/1980 | Shirey ......................... | 188/265 |
| 4,793,447 A * | 12/1988 | Taig et al. .................. | 188/72.1 |
| 5,348,123 A * | 9/1994 | Takahashi et al. ......... | 188/72.1 |
| 6,230,855 B1 * | 5/2001 | Holding ...................... | 188/158 |
| 6,311,808 B1 * | 11/2001 | Halasy-Wimmer et al. ...... | 188/72.6 |
| 2005/0252732 A1 * | 11/2005 | Hashida et al. ............ | 188/71.9 |

FOREIGN PATENT DOCUMENTS

JP    2000-504811 A    4/2000

* cited by examiner

*Primary Examiner*—Chris Schwartz
(74) *Attorney, Agent, or Firm*—Buchanan Ingersoll & Rooney PC

(57) ABSTRACT

In a brake apparatus, a lead in a meshed portion between an external-thread portion (second stationary screw element) of a threaded shaft and an internal-thread portion (second movable screw element) of a nut is shorter than that in a meshed portion between an internal-thread portion (first stationary screw element) of a cylinder and an external-thread portion (first movable screw element) of a second piston. Accordingly, as the second piston and the nut move toward a control chamber while rotating in a unitary condition via a friction clutch, the second piston and the nut are united via the friction clutch, so that a contact portion between the thread surface of the second stationary screw element and the thread surface of the second movable screw element and a contact portion between the thread surface of the first stationary screw element and the thread surface of the first movable screw element push out against each other.

3 Claims, 11 Drawing Sheets

COMBINED SERVICE AND PARKING BRAKE APPARATUS

BACKGROUND OF THE INVENTION

1. Field of the Invention

The present invention relates to a combined service and parking brake apparatus capable of being used as a vehicular brake apparatus, capable of generating braking force by means of brake fluid pressure not only when the apparatus is used as a service brake but also when the apparatus is used as a parking brake, and configured such that, when the apparatus is used as a parking brake, after generation of braking force, the apparatus is mechanically locked to maintain braking force.

2. Description of the Related Art

A combined service and parking brake apparatus of this type is disclosed in, for example, Japanese Kohyo (PCT) Patent Publication No. 2000-504811. The combined service and parking brake apparatus shown in FIG. 4 of the publication includes a piston disposed in a cylinder in such a manner as to be nonrotatable about a cylinder axis and movable along the cylinder axis to thereby form a hydraulic chamber within the cylinder; a brake lining to be moved under pressure by the piston and engaged with a rotary member to be braked, when the piston is moved under the pressure of brake fluid fed into the hydraulic chamber, thereby effecting a braking operation on the rotary member; and adjusting nut attached, within the hydraulic chamber, to the cylinder in such a manner as to be rotatable about the cylinder axis and movable along the cylinder axis; a friction clutch provided between the adjusting nut and the cylinder, allowing rotation of the adjusting nut in an unlocked condition where the adjusting nut is as its home position, and disabling rotation of the adjusting nut in a locked condition where the adjusting nut has moved along the cylinder axis by a predetermined distance from its home position; an adjuster including an external-thread portion of an adjusting spindle provided integrally with the piston and an internal-thread portion provided integrally with the adjusting nut and meshed with the external-thread portion, capable of automatically adjusting operation timing of the friction clutch through automatic adjustment of the clearance between the piston and the adjusting nut in accordance with the amount of wear of the brake lining; and an electromagnetic actuator capable of holding the friction clutch in an engaged condition while the brake lining, having moved under pressure applied by the piston, is clamping the rotary member to be braked.

In the combined service and parking brake apparatus of the above-mentioned publication, by means of deactivating (de-energizing) the electromagnetic actuator, the friction clutch can be held in a disengaged condition, thereby allowing rotation of the adjusting nut and movement, along the cylinder axis, of the piston connected to the adjusting nut via the adjuster. Accordingly, at this time, by means of feed of brake fluid into or drainage of brake fluid from the hydraulic chamber, the piston can be advanced or retreated along the cylinder axis; i.e., the apparatus can be operated as a service brake.

By means of activating (energizing) the electromagnetic actuator, the friction clutch can be held in an engaged condition, thereby preventing rotation of the adjusting nut and thus preventing movement, along the cylinder axis, of the piston connected to the adjusting nut via the adjuster. Accordingly, the combined service and parking brake apparatus can be operated as a parking brake as follows. In a condition where brake fluid is fed under pressure into the hydraulic chamber, and the piston is advanced along the cylinder axis (a braking state where the brake lining is moved under pressure applied by the piston and engaged with the rotary member to be braked), the electromagnetic actuator is activated, thereby brining the friction clutch into an engaged condition and thus preventing rotation of the adjusting nut and movement, along the cylinder axis, of the piston connected to the adjusting nut via the adjuster. Accordingly, even when brake fluid is drained from the hydraulic chamber, the braking state can be maintained; i.e., the brake apparatus can operate as a parking brake.

In operation of the combined service and parking brake apparatus of the above-mentioned publication as a parking brake, while brake fluid is fed under pressure into the hydraulic chamber, the electromagnetic actuator is activated, thereby bringing the friction clutch into an engaged condition. In this case, a meshed portion between the external-thread portion of the adjusting spindle and the internal-thread portion of the adjusting nut is in a stretched condition. In subsequent release of brake fluid pressure (in halt of feed of brake fluid into the hydraulic chamber), reaction force of the brake lining causes the piston to be pressed back by a thread-to-thread clearance present in the meshed portion between the external-thread portion of the adjusting spindle and the internal-thread portion of the adjusting nut. This unavoidably causes a drop in parking brake force.

SUMMARY OF THE INVENTION

In order to solve the aforesaid problem, the present invention provides a combined service and parking brake apparatus comprising a piston disposed in a cylinder in such a manner as to be nonrotatable about a cylinder axis and movable along the cylinder axis to thereby form a hydraulic chamber within the cylinder; a brake lining to be moved under pressure by the piston and engaged with a rotary member to be braked, when the piston is moved under pressure of brake fluid fed into the hydraulic chamber, thereby effecting a braking operation on the rotary member; a movable member provided within the hydraulic chamber in such a manner as to be rotatable about the cylinder axis and movable along the cylinder axis between its home position and its non-home position, movement of the movable member in a piston-returning direction being restricted to the home position, the movable member being urged, by first biasing means, along the cylinder axis from the home position toward the non-home position; a first stationary screw element provided integrally with the cylinder within the hydraulic chamber, extending along the cylinder axis, and having a predetermined lead; a first movable screw element having a thread surface engaged with a thread surface of the first stationary screw element, provided integrally with the moving member, and meshed with the first stationary screw element with a predetermined thread-to-thread clearance present therebetween along the cylinder axis; a second stationary screw element disposed coaxially with the first stationary screw element within the hydraulic chamber, provided integrally with the piston, extending along the cylinder axis, and having a lead shorter than the lead of the first stationary screw element; a second movable screw element having a thread surface engaged with a thread surface of the second stationary screw element, provided within the hydraulic chamber in such a manner as to be rotatable about the cylinder axis and movable along the cylinder axis, meshed with the second stationary screw element with a predetermined thread-to-thread clearance present therebetween along the cylinder axis, and urged along the cylinder axis against the first biasing means by second biasing means having biasing force greater than that of the first biasing means; a friction clutch capable of engaging the second movable screw element and the movable member with each other and disengaging the second movable screw element and the movable member from each other, the friction clutch being brought in a disengaged condition and allowing relative rotation between the second movable screw element and the movable member at the time of the second movable screw element moving away from the movable member against the second biasing means, and the friction clutch being brought into an engaged condition and restricting relative rotation between the second movable screw element and the movable member at the time of the second movable screw element being urged by the second biasing means and engaging with the movable member; and a drive device capable of moving the movable member and the second movable screw element along the cylinder axis against the second biasing means from their respective home positions toward their respective non-home positions.

When the combined service and parking brake apparatus according to the present invention is to be operated as a parking brake; i.e., in a condition where brake fluid is fed under pressure into the hydraulic chamber (in a condition where the brake lining is moved under pressure applied by the piston and engaged with the rotary member to be braked, thereby effecting a braking operation on the rotary member), when the drive device is activated so as to move the movable member and the second movable screw element along the cylinder axis against the second biasing means from their respective home positions toward their respective non-home positions, biasing force of the second biasing means causes the friction clutch to be maintained in an engaged condition. Accordingly, since the engaged friction clutch restricts relative rotation between the movable member and the second movable screw element, the movable member and the second movable screw element move along the cylinder axis while rotating in a unitary condition.

Meanwhile, in the brake apparatus, a lead in a meshed portion between the second stationary screw element and the second movable screw element is shorter than that in a meshed portion between the first stationary screw element and the first movable screw element. Accordingly, as the movable member and the second movable screw element move along the cylinder axis while rotating in a unitary condition via the friction clutch, the thread-to-thread clearance along the cylinder axis in the meshed portion between the second stationary screw element and the second movable screw element disappears on a side toward the moving direction of the second movable screw element, so that the thread surface of the second stationary screw element on a side opposite the moving direction and the thread surface of the second movable screw element on the side toward the moving direction contact with other. Subsequently, the thread-to-thread clearance along the cylinder axis in the meshed portion between the first stationary screw element and the first movable screw element disappears on a side opposite the moving direction of the first movable screw element, so that the thread surface of the first stationary screw element on the side toward the moving direction and the thread surface of the first movable screw element on the side opposite the moving direction contact each other. As a result, unitary rotation of the movable member and the second movable screw element stops.

In this condition, the movable member and the second movable screw element are united via the engaged friction clutch, so that a contact portion between the thread surface of the second stationary screw element and the thread surface of the second movable screw element and a contact portion between the thread surface of the first stationary screw element and the thread surface of the first movable screw element push out against each other. Accordingly, in this condition, even when fluid pressure in the hydraulic chamber drops, and consequently, reaction force that the brake lining imposes on the piston is directed to pressing the piston backward, the condition where the above-mentioned both contact portions push out against each other remains unchanged. Therefore, by means of setting structural design parameters in such a manner that reaction force that the brake lining imposes on the piston does not cause slippage in the friction clutch and in the above-mentioned both contact portions, at the time of release of brake fluid pressure associated with operation of the brake apparatus as a parking brake, the piston is not pressed backward along the cylinder axis and is maintained in a mechanically locked condition. Accordingly, the brake apparatus can avoid a drop in parking brake force in release of brake fluid pressure.

In the present invention, preferably, the movable member is a second piston disposed within the hydraulic chamber in such a manner as to be rotatable about the cylinder axis and movable along the cylinder axis to thereby divide the hydraulic chamber into a main chamber and a control chamber; and the drive device is a changeover valve provided in the hydraulic branch line allowing feed and drainage of brake fluid therethrough to and from the control chamber and branched from a hydraulic line allowing feed and drainage of brake fluid therethrough to and from the main chamber, the changeover valve being able to establish and shut off communication between the main chamber and the control chamber. In this case, since no electrical device is accommodated in the hydraulic chamber of the cylinder, the brake apparatus is free from any anxiety about the electrical device with respect to fluid resistance, seal integrity, heat resistance, and the like, thereby providing high reliability.

In this case, preferably, a reservoir is connected to the changeover valve, and the reservoir can store brake fluid drained from the control chamber when communication between the main chamber and the control chamber is shut off. Since fluid pressure difference between the main chamber and the control chamber that acts on the second piston can be increased when communication between the main chamber and the control chamber is shut off by the changeover valve, operational response of the second piston can be enhanced, and thus operational response of a parking brake can be enhanced.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

Figure 1:
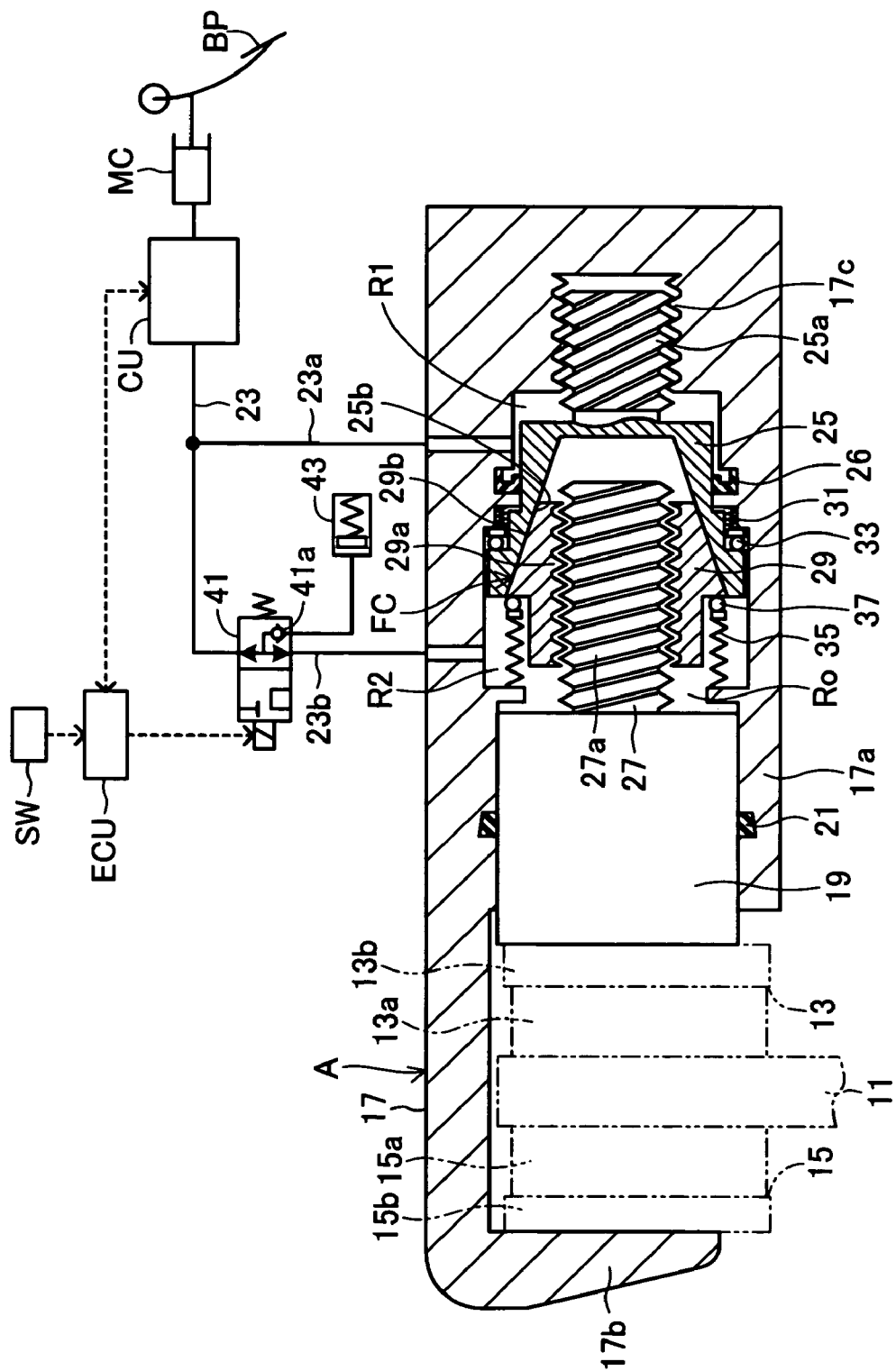
FIG. 1 is a schematic block diagram of a brake system including a combined service and parking brake apparatus (in a brake-released condition) according to the present invention.

An embodiment of the present invention will next be described in detail with reference to the drawings. FIG. 1 schematically shows the embodiment in which the present invention is applied to a movable-caliper-type disc brake. A combined service and parking brake apparatus A of this embodiment is employed for each of rear left and rear right wheels (one of them is not shown) in a brake system of a 4-wheeled automobile. The brake system includes a master cylinder MC, which operates in accordance with operation of a brake pedal BP to be stepped on, and a brake fluid pressure control unit CU, which can perform skid control and traction control. This brake system employs an ordinary disc brake apparatus (not shown) for each of front left and front right wheels.

The combined service and parking brake apparatus A includes an inner pad 13 and an outer pad 15, which are adapted to clamp a disc rotor 11 (which rotates unitarily with an unillustrated wheel and serves as a rotary member to be braked) from opposite sides so as to effect a braking operation on the disc rotor 11; a movable caliper 17 for causing the both pads 13 and 15 to move under pressure toward the disc rotor 11, and a piston 19. The both pads 13 and 15 and the movable caliper 17 are attached to a mounting (not shown), which is attached to a vehicle body, in such a manner as to be slidable along the rotor axis.

The inner pad 13 includes a brake lining 13a and a backing plate 13b. The inner pad 13 can engage with and disengage from the disc rotor 11 via a brake lining 13a. The piston 19 fitted to a cylinder 17a of the movable caliper 17 causes the inner pad 13 to move under pressure toward the disc rotor 11. The outer pad 15 includes a brake lining 15a and a backing plate 15b and can engage with and disengage from the disc rotor 11 via the brake lining 15a. A reaction applicator portion 17b of the movable caliper 17 causes the outer pad 15 to move under pressure toward the disc rotor 11.

The piston 19 is fitted, via a piston seal 21, to the cylinder 17a of the movable caliper 17 in such a manner as to be nonrotatable about the cylinder axis and movable along the cylinder axis (substantially in parallel with the rotor axis), thereby forming a hydraulic chamber Ro filled with brake fluid within the cylinder 17a. The hydraulic chamber Ro is connected to a hydraulic lines 23a and 23b that partially constitute a hydraulic brake fluid line 23, and allows feed of brake fluid thereinto and drainage of brake fluid therefrom through the hydraulic lines 23a and 23b. The piston seal 21 is designed to be deformed toward the disc rotor 11 at the time of application of brake fluid pressure when the piston 19 is moved under pressure toward the disc rotor 11. The piston seal 21 has a function of retracting the piston 19 (retractive function) by means of restoration from deformation at the time of release of brake fluid pressure.

In this embodiment, an internal-thread portion 17c is provided integrally with the cylinder 17a of the movable caliper 17. Further, a second piston 25, a threaded shaft 27, and a nut 29 are installed in the cylinder 17a of the movable caliper 17; and a first spring 31, a thrust bearing 33, a second spring 35 and a thrust bearing 37 are attached to the cylinder 17a. A changeover valve 41 is installed in a hydraulic branch line 23b branched from the hydraulic line 23a. A reservoir 43 is connected to the changeover valve 41.

In the hydraulic chamber Ro, the second piston 25 is attached, via a seal cup 26, to the cylinder 17a in such a manner as to be rotatable about the cylinder axis and movable along the cylinder axis between its home position (position shown in FIG. 1) and its non-home position, thereby dividing the hydraulic chamber Ro into a main chamber R1 and a control chamber R2. The main chamber R1 is connected to the hydraulic line 23a and allows brake fluid to be fed thereinto and drained therefrom through the hydraulic line 23a. The control chamber R2 is connected to the hydraulic branch line 23b and allows brake fluid to be fed thereinto and drained therefrom through the hydraulic branch line 23b.

The second piston 25 is urged along the cylinder axis from its home position toward its non-home position (leftward in FIG. 1) by the first spring 31 via the thrust bearing 33. As shown in FIG. 1, movement of the second piston 25 in the piston-returning direction (rightward in FIG. 1) of the piston 19 is restricted to the home position where the thrust bearing 33 abuts a stepped portion of the cylinder 17a. The second piston 25 has an external-thread portion 25a, which is provided integrally therewith and meshed with the internal-thread portion 17c provided integrally with the cylinder 17a.

The internal-thread portion 17c of the cylinder 17a is a first stationary screw element having a predetermined lead and extends along the cylinder axis while being exposed to the main chamber R1. The external-thread portion 25a of the second piston 25 is a first movable screw element meshed with the internal-thread portion 17c of the cylinder 17a with a predetermined thread-to-thread clearance present therebetween along the cylinder axis and has a thread surface engaged with a thread surface of the internal-thread portion 17c of the cylinder 17a.

The threaded shaft 27 has an external-thread portion 27a, which serves as a second stationary screw element having a lead shorter than the lead of the first stationary screw element; is provided integrally with the piston 19 while being disposed coaxially with the internal-thread portion 17c of the cylinder 17a; and extends along the cylinder axis while being exposed to the control chamber R2.

The nut 29 has an internal-thread portion 29a, which serves as a second movable screw element and is urged along the cylinder axis against the first spring 31 by the second spring 35 having biasing force greater than that of the first spring 31. The nut 29 is provided within the control chamber R2 in such a manner as to be roatable about the cylinder axis and movable along the cylinder axis. The internal-thread portion 29a of the nut 29 is meshed with the external-thread portion 27a of the threaded shaft 27 with a predetermined thread-to-thread clearance present therebetween along the cylinder axis and has a thread surface engaged with a thread surface of the external-thread portion 27a.

The nut 29 has a taper portion 29b, which is formed on its outer circumferential surface and whose diameter reduced toward the piston 25. The taper portion 29b can be engaged with and disengaged from a taper portion 25b formed on the second piston 25. The taper portion 29b of the nut 29, the taper portion 25b of the second piston 25, the both springs 31 and 35, and the like constitute a friction clutch FC.

The friction clutch FC allows engagement and disengagement between the second piston 25 and the nut 29. At the time of disengagement when the nut 29 moves away from the second piston 25 against the second spring 35, the friction clutch FC allows relative rotation between the second piston 25 and the nut 29. At the time of engagement when the nut 29 is urged by the second spring 35 to engage with the second piston 25, the friction clutch FC restricts relative rotation between the second piston 25 and the nut 29.

The changeover valve 41 is an electromagnetic 3-port 2-position changeover valve whose energization and de-energization are controlled by an electric control unit ECU. The changeover valve 41 is installed in the hydraulic branch line 23b, which allows feed and drainage of brake fluid therethrough to and from the control chamber R2 and is branched from the hydraulic line 23a allowing feed and drainage of brake fluid therethrough to and from the main chamber R1. The changeover valve 41 can establish and shut off communication between the main chamber R1 and the control chamber R2 and establish and restrict communication between the control chamber R2 and the reservoir 43. When the changeover valve 41 is de-energized, the changeover valve 41 establishes communication between the main chamber R1 and the control chamber R2, and a check valve 41a incorporated in the changeover valve 41 prevents brake fluid flow to the reservoir 43. When the changeover valve 41 is energized, the changeover valve 41 shuts off communication between the main chamber R1 and the control chamber R2 and establishes communication between the control chamber R2 and the reservoir 43 to thereby allow brake fluid flow from the control chamber R2 to the reservoir 43.

The reservoir 43 is connected to the changeover valve 41. When communication between the main chamber R1 and the control chamber R2 is shut off by the changeover valve 41, the reservoir 43 can store brake fluid drained from the control chamber R2. When the changeover valve 41 establishes communication between the main chamber R1 and the control chamber R2 in a condition where brake fluid is not fed from the brake fluid pressure control unit CU to the hydraulic branch line 23b, the reservoir 43 allows drainage of brake fluid stored therein toward the hydraulic branch line 23b through the check valve 41a.

During travel of the vehicle, the brake fluid pressure control unit CU can perform skid control and traction control while being controlled in a known manner by the electric control unit ECU. During halt of the vehicle, the brake fluid pressure control unit CU can control operation of the combined service and parking brake apparatus A while being controlled, together with the changeover valve 41, by the electric control unit ECU on the basis of operation of a parking brake switch SW. Since the configuration of the brake fluid pressure control unit CU is known, description thereof is omitted.

In a case where the parking brake switch SW is turned OFF so as to use the thus-configured combined service and parking brake apparatus A of this embodiment as a service brake, the changeover valve 41 is de-energized, so that the main chamber R1 and the control chamber R2 always communicate with each other and have the same pressure, and the check valve 41a incorporated in the changeover valve 41 prevents brake fluid flow from the hydraulic branch circuit 23b to the reservoir 43.

In this condition (a service-brake-operating condition), fluid pressure difference between the main chamber R1 and the control chamber R2 is always zero, so that pressing force induced by fluid pressure difference does not act on the second piston 25. Accordingly, as shown in FIG. 1, the second spring 35 whose biasing force is greater than that of the first spring 31 causes the second piston 25 and the nut 29 to be held in their respective home positions, and the friction clutch FC is held engaged.

In this service-brake-operating condition, when the brake pedal BP is stepped on, the master cylinder MC feeds brake fluid under pressure to the hydraulic line 23a via the brake fluid pressure control unit CU; brake fluid is fed under pressure into the main chamber R1 from the hydraulic line 23a; and brake fluid is fed under pressure into the control chamber R2 from the hydraulic line 23a via the hydraulic branch line 23b and the changeover valve 41.

Figure 2:
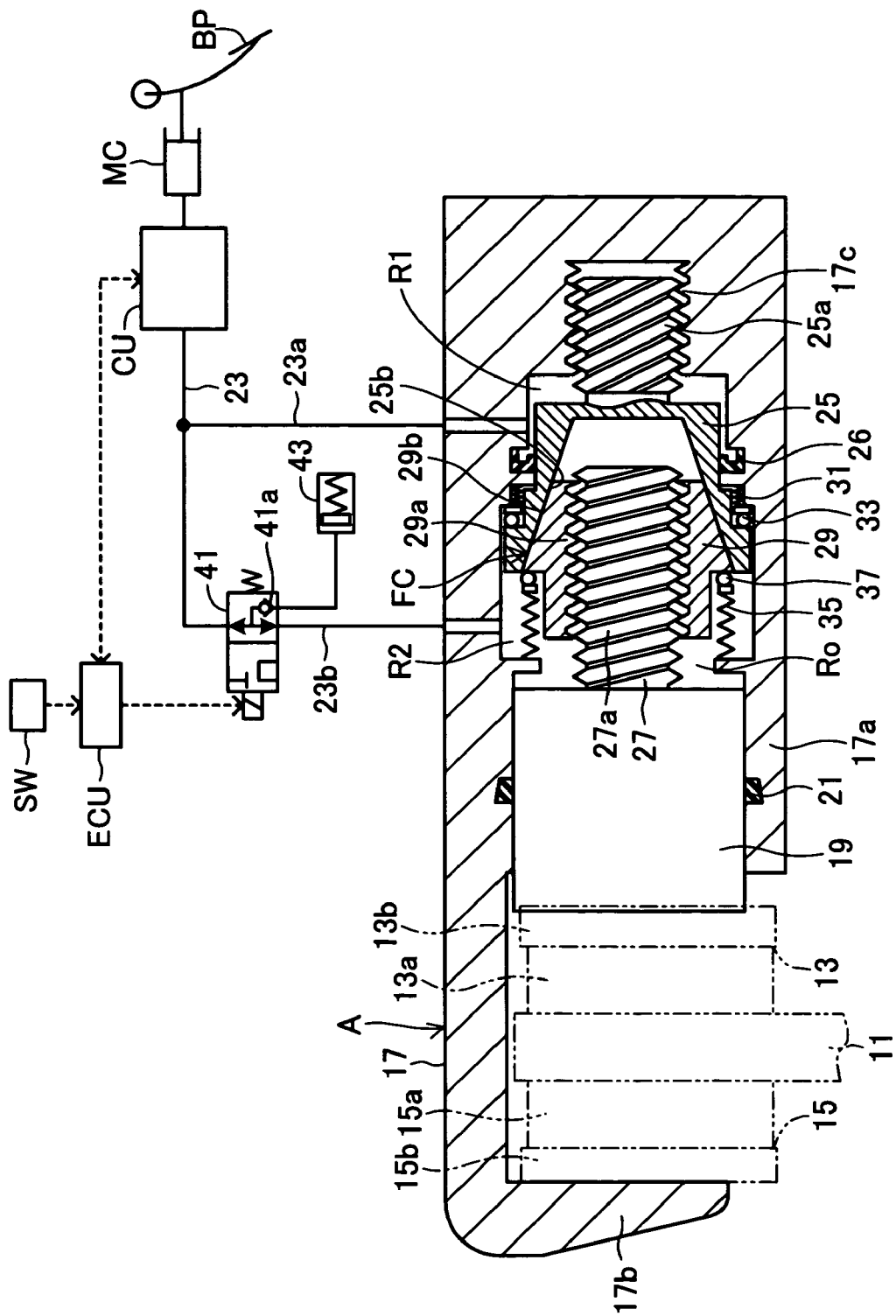
FIG. 2 is an explanatory view for explaining actions of the combined service and parking brake apparatus shown in FIG. 1 when the brake apparatus operates as a service brake.

At this time, therefore, as shown in FIG. 2, while the second piston 25 and the nut 29 stand still, the piston 19 can be advanced (in the leftward direction in the figure) along the cylinder axis over a range of a thread-to-thread clearance between the external-thread portion 27a of the threaded shaft 27 and the internal-thread portion 29a of the nut 29 by means of feed of brake fluid under pressure into the main chamber R1 and the control chamber R2. In other words, the brake apparatus A can be operated as a service brake.

At this time, brake fluid fed under pressure into the control chamber R2 causes the piston 19 to move along the cylinder axis toward the disc rotor 11 while the piston 19 causes the piston seal 21 to be deformed toward the disc rotor 11, thereby pressing the inner pad 13 against the disc rotor 11. Associated reaction force causes the movable caliper 17 to move inboard, so that the reaction applicator portion 17b of the movable caliper 17 presses the outer pad 15 against the disc rotor 11. An unillustrated mounting, which supports the both pads 13 and 15, receives force generated as a result of the both pads 13 and 15 pressing the disc rotor 11, thereby generating braking force that prevents rotation of the disc rotor 11. In this brake-activated condition, the movable caliper 17 and other relevant component members are deflected in accordance with feed of brake fluid under pressure.

In release of brake fluid pressure effected by elimination of feed of brake fluid under pressure from the master cylinder MC into the main chamber R1 and the control chamber R2 as a result of release of the brake pedal BP, a retractive function effected by restoration of the piston seal 21 from the above-mentioned deformation and a retractive function effected by restoration of the movable caliper 17 and other relevant component members from deflection cause the piston 19 to move inboard and the movable caliper 17 to move outboard. Thus, the piston 19 returns to the brake-released condition of FIG. 1 from the brake-activated condition of FIG. 2, thereby releasing the both pads 13 and 15 from a condition of being pressed against the disc rotor 11. Thus is cancelled an action of braking rotation of the disc rotor 11 effected by both pads 13 and 15.

Figure 3:
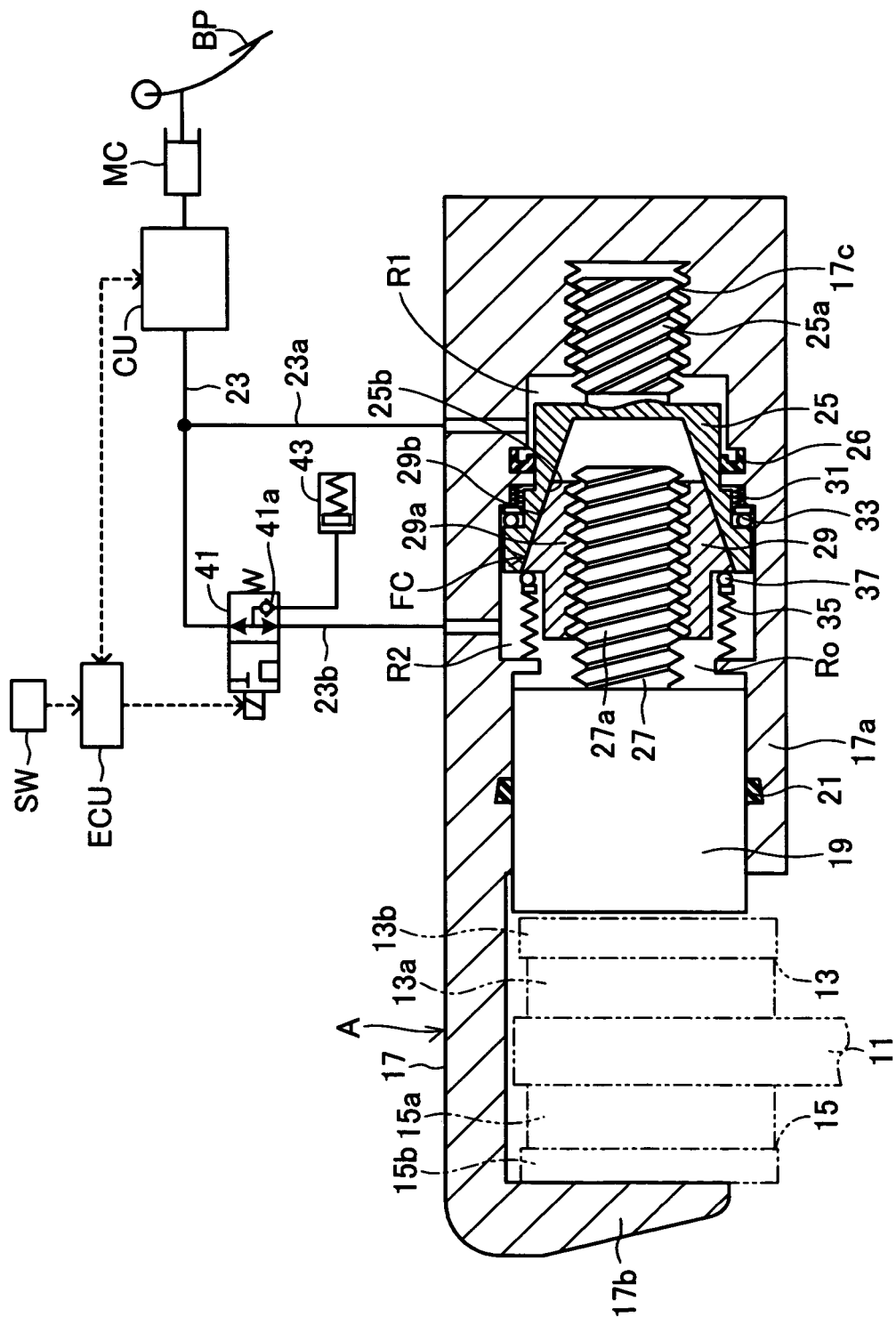
FIG. 3 is an explanatory view for explaining actions of the combined service and parking brake apparatus shown in FIG. 1 when lining is worn.
Figure 4:
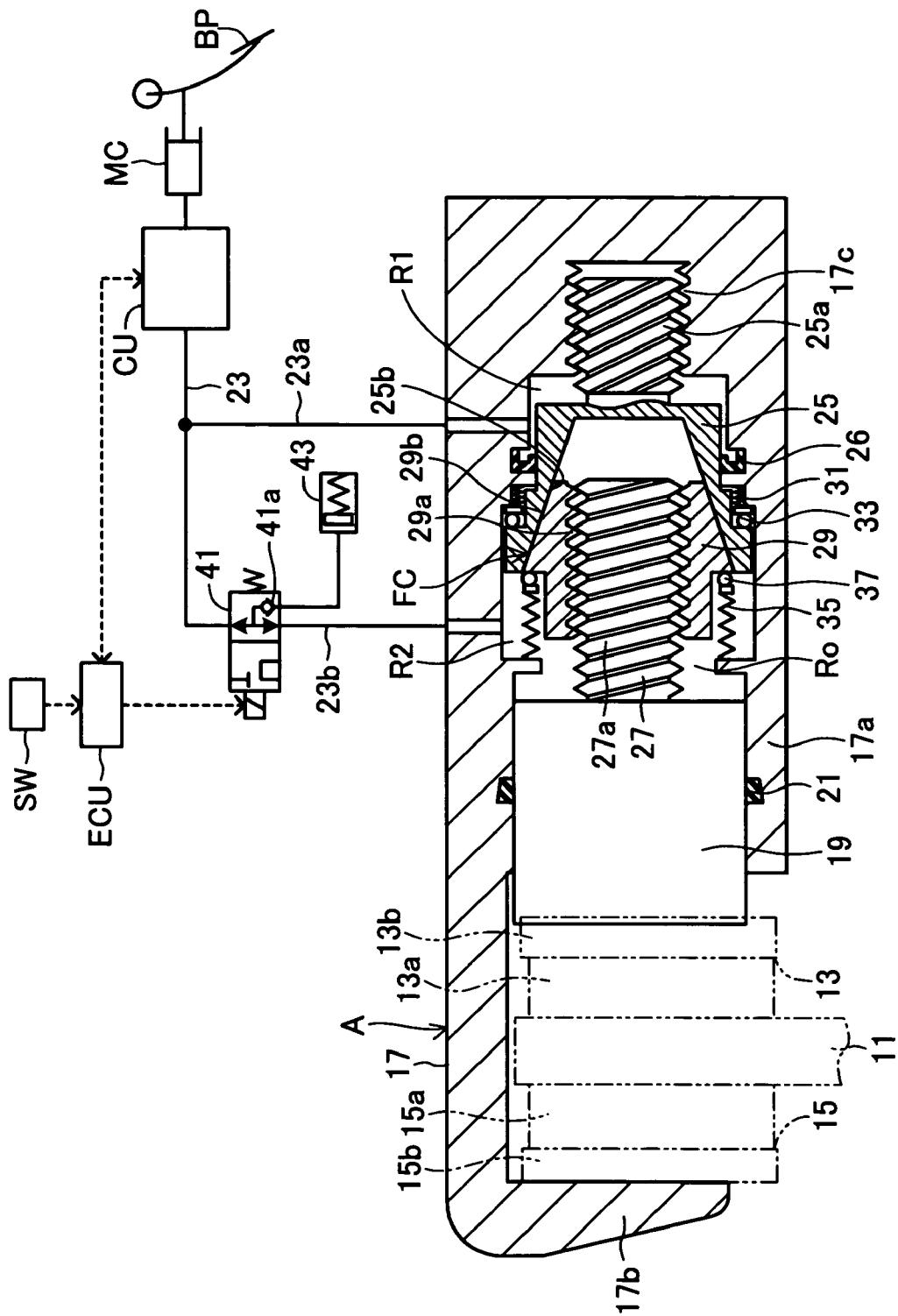
FIG. 4 is an explanatory view for explaining adjustment of the length of meshing engagement between an external-thread portion of a threaded shaft and an internal-thread portion of a nut in the combined service and parking brake apparatus shown in FIG. 1.

In the above-mentioned service-brake-operating condition, when, for example, the piston 19 is to advance along the cylinder axis by a distance equal to or longer than the thread-to-thread clearance between the external-thread portion 27a of the threaded shaft 27 and the internal-thread portion 29a of the nut 29 because of wear of the brake linings 13a and 15a, a condition shown in FIG. 4 is established through a condition shown in FIG. 3, and the nut 29 moves along the cylinder axis against the action of the second spring 35, thereby moving away from the second piston 25.

Figure 5:
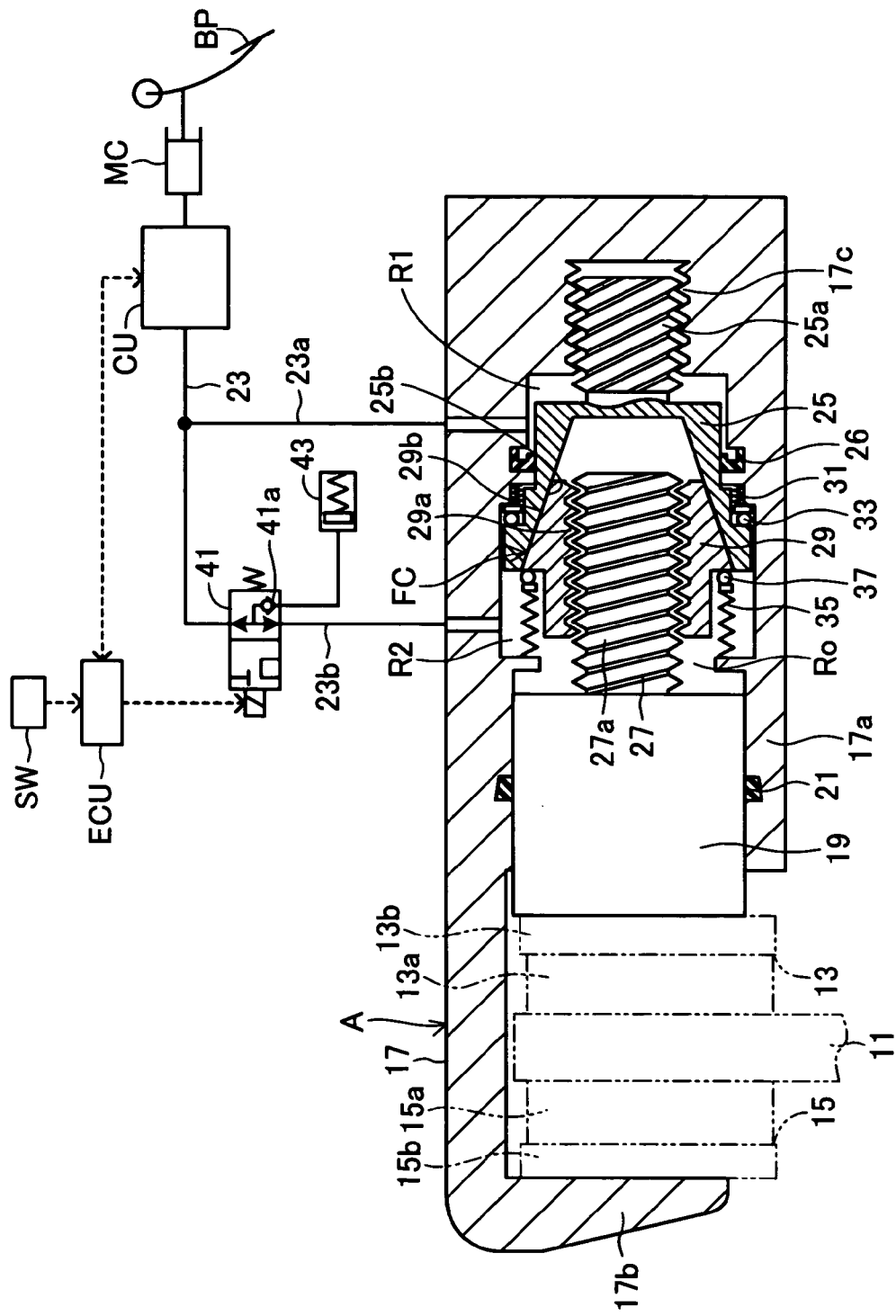
FIG. 5 is an explanatory view for explaining actions of the combined service and parking brake apparatus shown in FIG. 1 when the brake apparatus is brought into a brake-released condition after adjustment of the length of meshing engagement between the external-thread portion of the threaded shaft and the internal-thread portion of the nut.

Accordingly, the friction clutch FC is disengaged during the process from the condition shown in FIG. 3 to the condition shown in FIG. 4. The nut 29 is pressed with biasing force from the second spring 35 and rotates along the external-thread portion 27a of the threaded shaft 27, whereby the length of meshing engagement between the external-thread portion 27a of the threaded shaft 27 and the internal-thread portion 29a of the nut 29 is automatically adjusted. After the length of meshing engagement between the external-thread portion 27a of the threaded shaft 27 and the internal-thread portion 29a of the nut 29 is adjusted, in association with release of brake fluid pressure from the main chamber R1 and the control chamber R2, the above-mentioned retractive functions cause the piston 19 to move inboard and the movable caliper 17 to move outboard. Thus, the brake-activated condition of FIG. 4 is restored to the brake-released condition of FIG. 5.

When the parking brake switch SW in the OFF condition is turned ON so as to use the combined service and parking brake apparatus A of this embodiment as a parking brake, the parking brake operation is performed as follows: first, while the changeover valve 41 is brought into a de-energized condition by the electric control unit ECU, the electric control unit ECU causes the brake fluid pressure control unit CU to enter a pressure application control condition, whereby the brake fluid pressure control unit CU feeds a predetermined amount of brake fluid under pressure into the main chamber R1 and the control chamber R2 of the brake apparatus A.

Thus is obtained an operation similar to that in the case where, in the above-described service-brake-operating condition, the brake pedal BP is stepped on. The brake apparatus A can be operated as a parking brake. Subsequently, in a condition where brake fluid can be fed under pressure into the main chamber R1 of the brake apparatus A from the brake fluid pressure control unit CU, when the pressure of brake fluid fed to the brake apparatus A from the brake fluid pressure control unit CU reaches a predetermined value, as shown in FIG. 6, the electric control unit ECU causes the changeover valve 41 to be energized, thereby allowing brake fluid to flow into the reservoir 43 from the control chamber R2.

Figure 6:
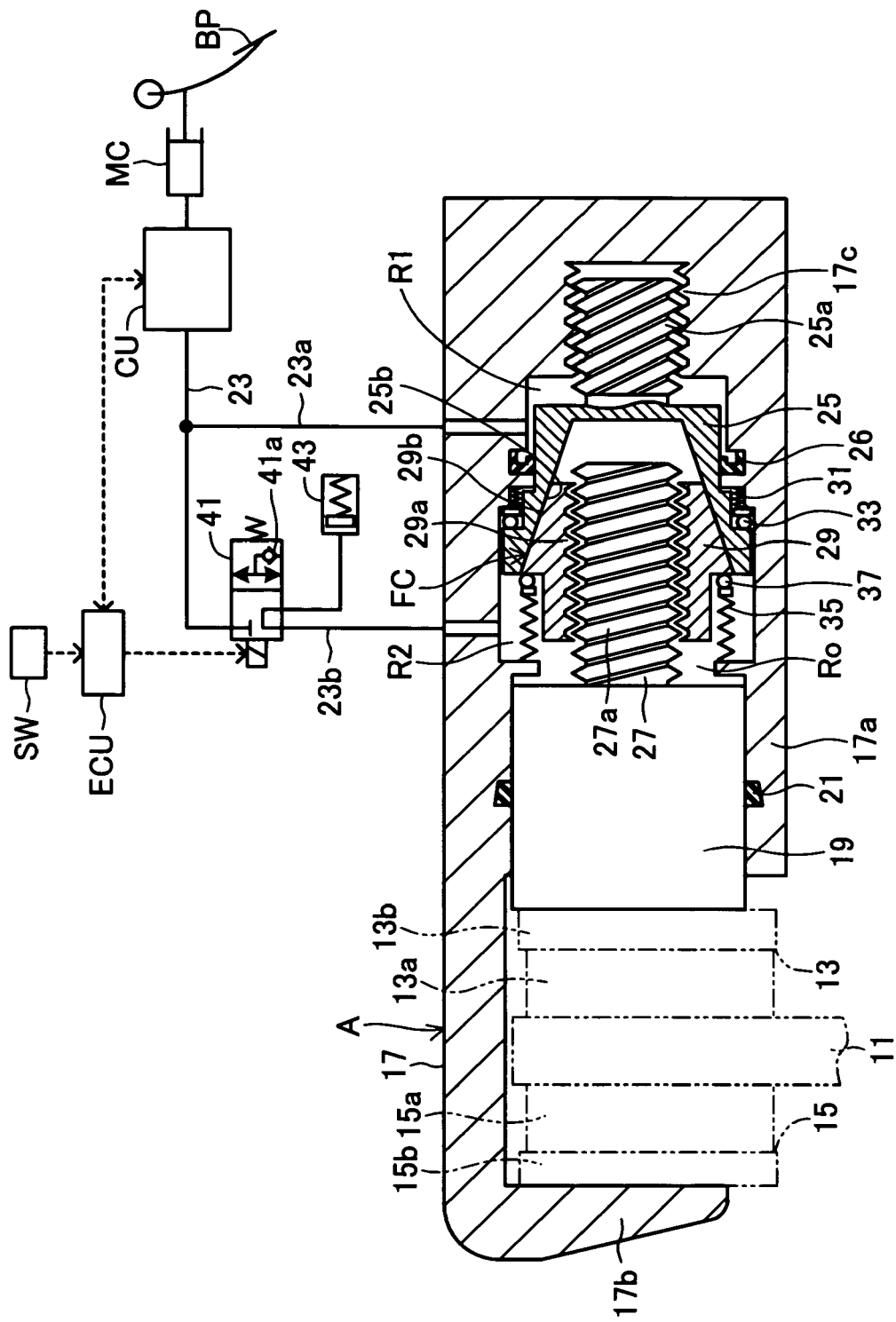
FIG. 6 is a first explanatory view for explaining actions of the combined service and parking brake apparatus shown in FIG. 1 when the brake apparatus operates as a parking brake.
Figure 8:
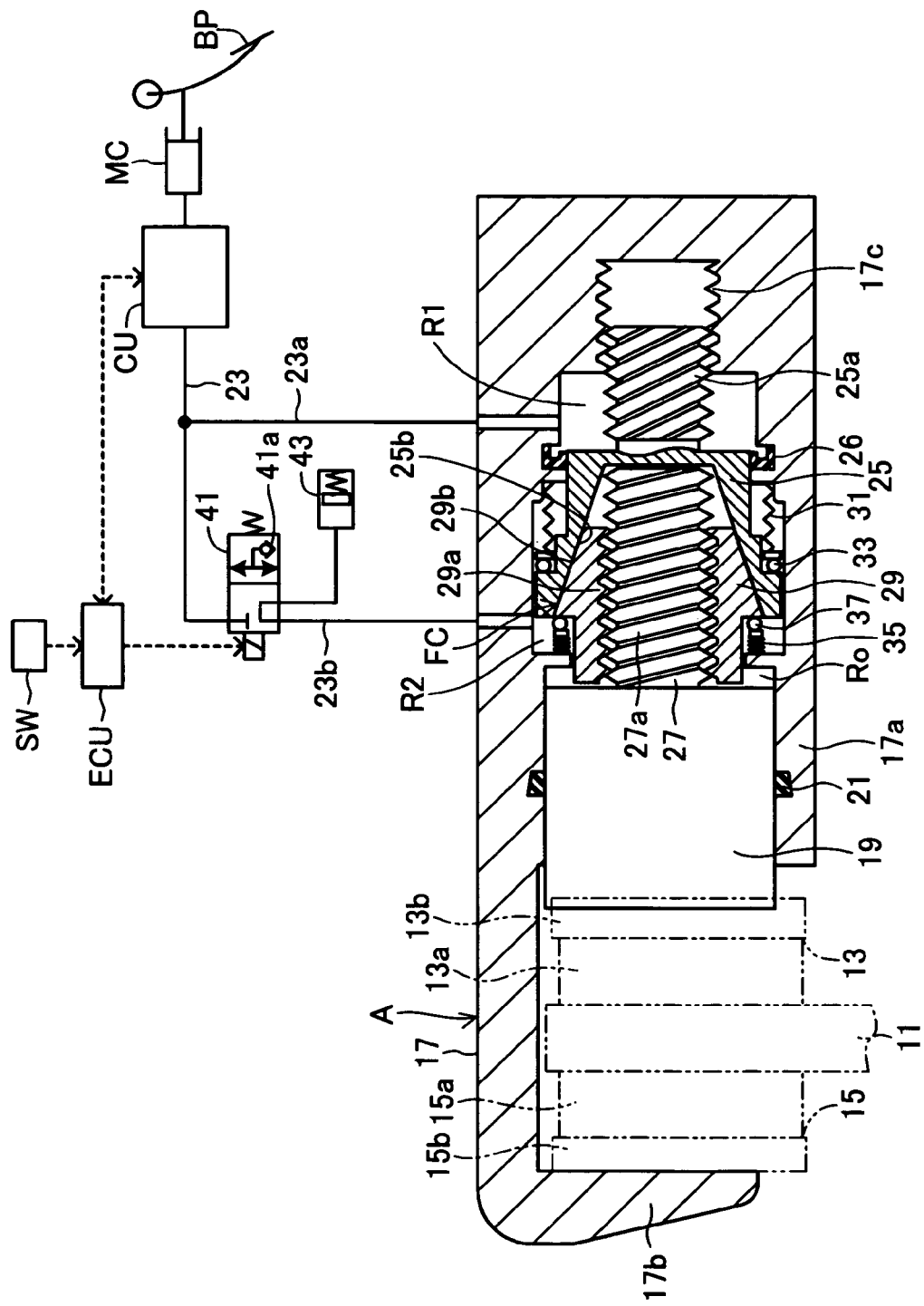
FIG. 8 is a third explanatory view for explaining actions of the combined service and parking brake apparatus shown in FIG. 1 when the brake apparatus operates as a parking brake.

In this condition, fluid pressure difference arises between the main chamber R1 and the control chamber R2, so that the second piston 25 moves against the second spring 35 along the cylinder axis from its home position shown in FIG. 6 toward its non-home position shown in FIG. 8. Since biasing force of the second spring 35 holds the friction clutch FC in an engaged condition, the engaged friction clutch FC restricts relative rotation between the second piston 25 and the nut 29, and the second piston 25 and the nut 29 move along the cylinder axis while rotating in a unitary condition.

Figure 7:
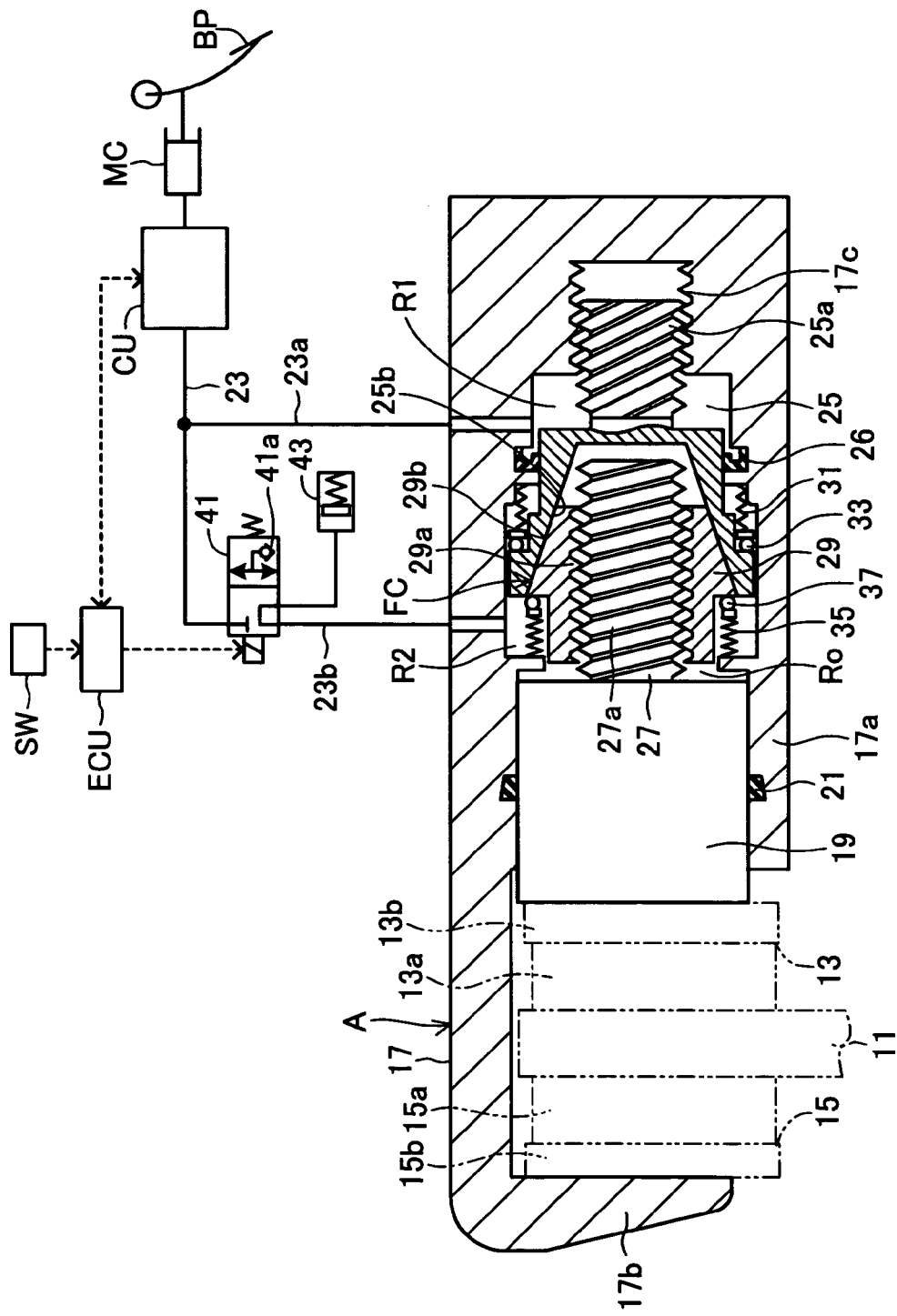
FIG. 7 is a second explanatory view for explaining actions of the combined service and parking brake apparatus shown in FIG. 1 when the brake apparatus operates as a parking brake.

Meanwhile, in the brake apparatus A, a lead in a meshed portion between the external-thread portion 27a (second stationary screw element) of the threaded shaft 27 and the internal-thread portion 29a (second movable screw element) of the nut 29 is shorter than that in a meshed portion between the internal-thread portion 17c (first stationary screw element) of the cylinder 17a and the external-thread portion 25a (first movable screw element) of the second piston 25. Accordingly, as the second piston 25 and the nut 29 move along the cylinder axis while rotating in a unitary condition via the friction clutch FC, as shown in FIG. 7, the thread-to-thread clearance along the cylinder axis in the meshed portion between the external-thread portion 27a (second stationary screw element) of the threaded shaft 27 and the internal-thread portion 29a (second movable screw element) of the nut 29 disappears on a side toward the moving direction of the internal-thread portion 29a, so that the thread surface of the external-thread portion 27a (second stationary screw element) on a side opposite the moving direction and the thread surface of the internal-thread portion 29a (second movable screw element) on the side toward the moving direction contact each other. Subsequently, as shown in FIG. 8, the thread-to-thread clearance along the cylinder axis in the meshed portion between the internal-thread portion 17c (first stationary screw element) of the cylinder 17a and the external-thread portion 25a (first movable screw element) of the second piston 25 disappears on a side opposite the moving direction of the external-thread portion 25a, so that the thread surface of the internal-thread portion 17c (first stationary screw element) on the side toward the moving direction and the thread surface of the external-thread portion 25a (first movable screw element) on the side opposite the moving direction contact each other. As a result, unitary rotation of the second piston 25 and the nut 29 stops.

In this condition, as shown in FIG. 8, the second piston 25 and the nut 29 are united via the engaged friction clutch FC, so that a contact portion between the thread surface of the external-thread portion 27a (second stationary screw element) and the thread surface of the internal-thread portion 29a (second movable screw element) and a contact portion between the thread surface of the internal-thread portion 17c (first stationary screw element) and the thread surface of the external-thread portion 25a (first movable screw element) push out against each other. Accordingly, in this condition, even when fluid pressure in the main chamber R1 drops as a result of the electric control unit ECU causing the brake fluid pressure control unit CU to change its condition from a pressure application control condition to a pressure release control condition, and consequently reaction force that the brake lining 13a imposes on the piston 19 is directed to pressing the piston 19 backward, the condition where the above-mentioned both contact portions push out against each other (a condition where thread surfaces are in pressed contact with each other in each of the contact portions) remains unchanged.

Therefore, by means of setting structural design parameters in such a manner that reaction force that the brake lining 13a imposes on the piston 19 does not cause slippage in the friction clutch FC and in the above-mentioned both contact portions, at the time of release of brake fluid pressure associated with operation of the brake apparatus A as a parking brake, the piston 19 is not pressed backward along the cylinder axis and is maintained in a mechanically locked condition. Accordingly, the brake apparatus A can avoid a drop in parking brake force in release of brake fluid pressure.

Meanwhile, when the electric control unit ECU causes the brake fluid pressure control unit CU to change its condition from the pressure application control condition to the pressure release control condition, the changeover valve 41 has been held in a de-energized condition by the electric control unit ECU. Thus, brake fluid that has flowed into the reservoir 43 from the control chamber R2 through the preceding operations (the operations shown in FIGS. 6 to 8) is drained toward the hydraulic branch line 23b through the check valve 41a.

When the parking brake switch SW in the ON condition is turned OFF so as to release the combined service and parking brake apparatus A of this embodiment from use as a parking brake, the parking brake is released as described below. First, in a condition where the changeover valve 41 has been held in a de-energized condition by the electric control unit ECU, the electric control unit ECU brings the brake fluid pressure control unit CU into the pressure application control condition, so that the brake fluid pressure control unit CU feeds brake fluid under pressure into the main chamber R1 and the control chamber R2 of the brake apparatus A.

When piston-projecting force induced by fluid pressure becomes greater than the above-mentioned reaction force that the brake lining 13a imposes on the piston 19, press contact between the thread surface of the external-thread portion 27a (second stationary screw element) and the thread surface of the internal-thread portion 29a (second movable screw element) is canceled, thereby canceling the condition where the contact portion between the thread surface of the external-thread portion 27a (second stationary screw element) and the thread surface of the internal-thread portion 29a (second movable screw element) and the contact portion between the thread surface of the internal-thread portion 17c (first stationary screw element) and the thread surface of the external-thread portion 25a (first movable screw element) push out against each other.

Figure 9:
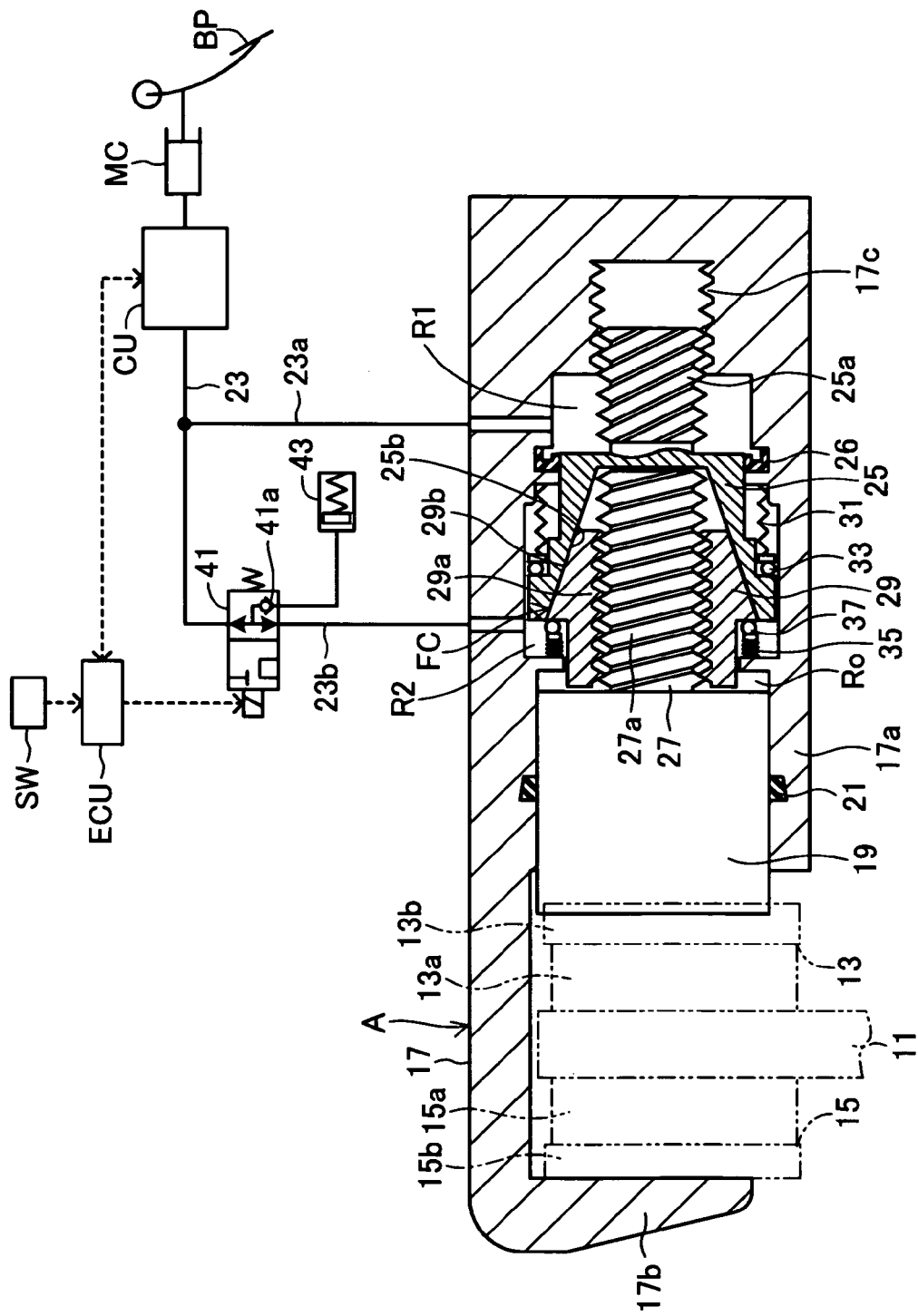
FIG. 9 is a first explanatory view for explaining actions of the combined service and parking brake apparatus shown in FIG. 1 when the brake apparatus is released from use as a parking brake.
Figure 10:
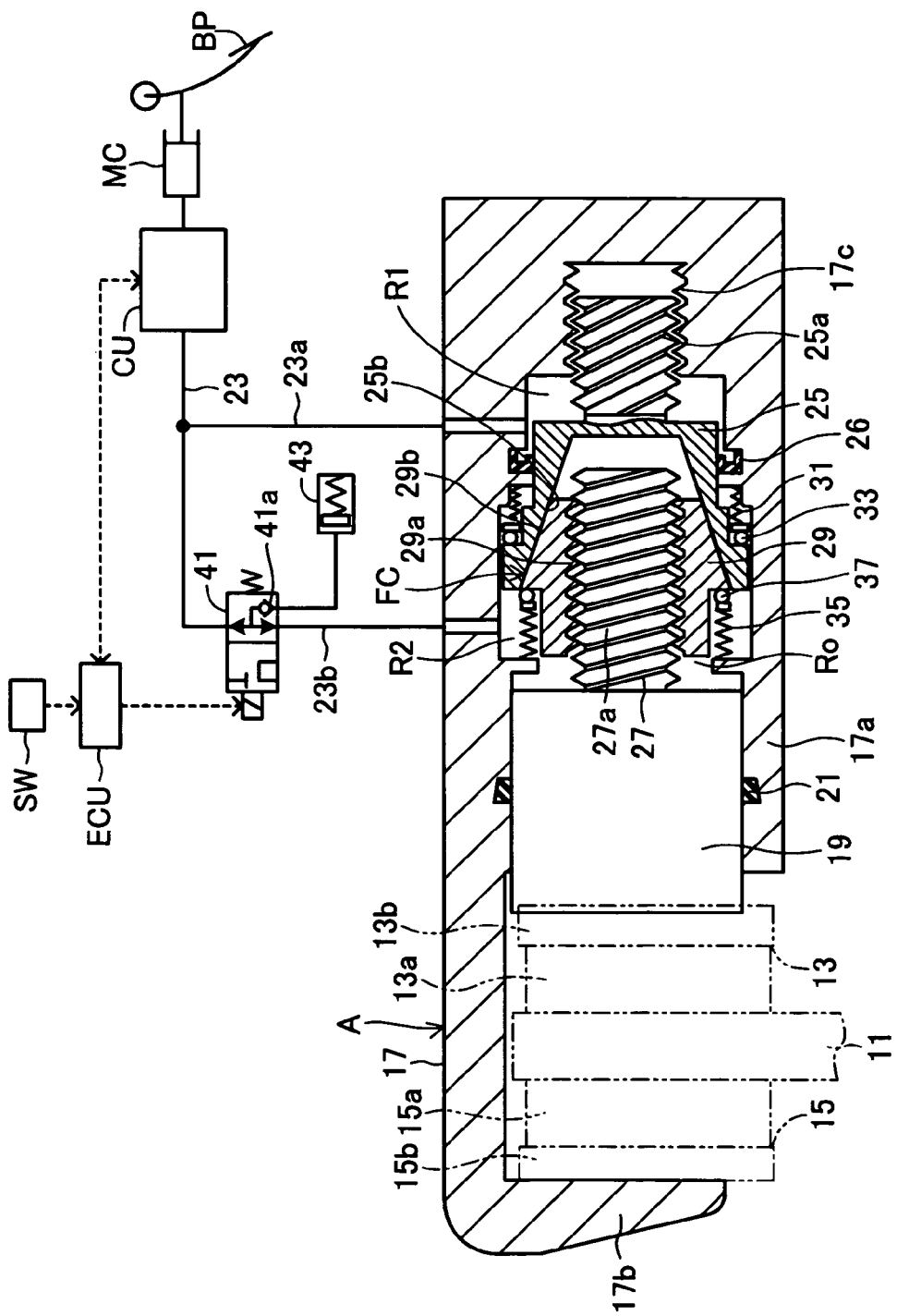
FIG. 10 is a second explanatory view for explaining actions of the combined service and parking brake apparatus shown in FIG. 1 when the brake apparatus is released from use as a parking brake.
Figure 11:
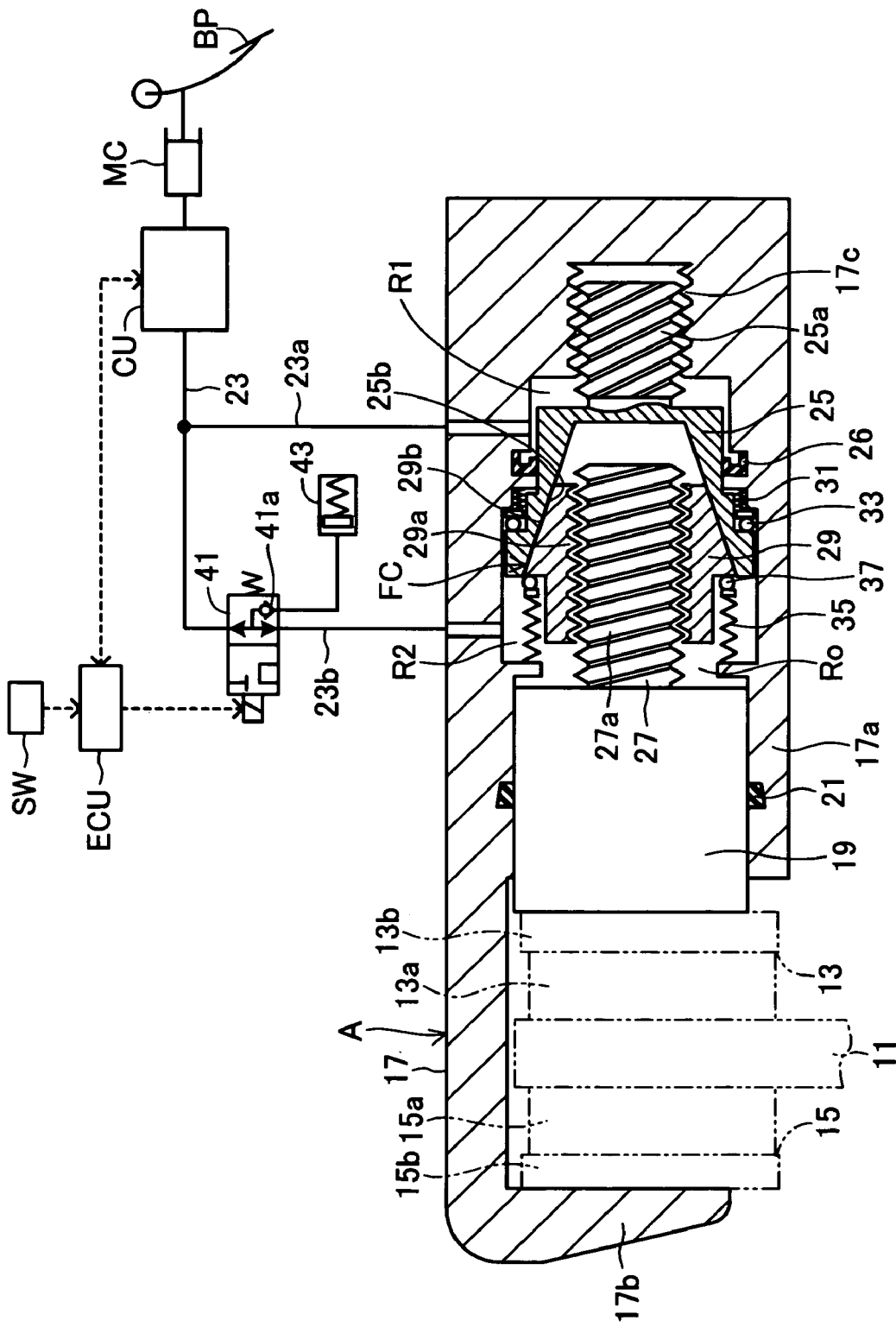
FIG. 11 is a third explanatory view for explaining actions of the combined service and parking brake apparatus shown in FIG. 1 when the brake apparatus is released from use as a parking brake.

In this condition, as shown in FIGS. 9 to 11, biasing force of the second spring 35 causes the second piston 25 and the nut 29 to move along the cylinder axis toward their respective home positions while rotating in a unitary condition via the friction clutch FC. As a result, there is re-established the same condition as that (FIG. 6) in the initial stage of the above-mentioned parking brake operation in which pressure application is initiated. In the initial stage of movement of the second piston 25 and the nut 29 from their respective non-home positions toward their respective home positions, the second piston 25 and the nut 29 move while rotating, in accordance with the lead of the internal-thread portion 17c (first stationary screw element) and the lead of the external-thread portion 25a (first movable screw element). In the middle and latter stages of the movement, the second piston 25 and the nut 29 move while rotating, in accordance with the lead of the external-thread portion 27a (second stationary screw element) and the lead of the internal-thread portion 29a (second movable screw element).

After the second piston 25 and the nut 29 return to their respective home positions by virtue of biasing force of the second spring 35, the electric control unit ECU causes the brake fluid pressure control unit CU to change its condition from the pressure application control condition to the pressure release control condition, thereby allowing drainage of brake fluid from the main chamber R1 and the control chamber R2. Accordingly, by virtue of the above-mentioned retractive functions, the piston 19 and the movable caliper 17 return to the brake-released condition shown in FIG. 1 or FIG. 5, thereby releasing the parking brake.

In the combined service and parking brake apparatus A of this embodiment, fluid pressure difference that arises between the main chamber R1 and the control chamber R2 causes the second piston 25 and the nut 29 to move against the second spring 35 along the cylinder axis from their respective home positions shown in FIG. 6 to their respective non-home positions shown in FIG. 8, so that no electrical device is accommodated in the hydraulic chamber Ro of the cylinder 17a of the movable caliper 17. Thus, the brake apparatus A is free from any anxiety about the electrical device with respect to fluid resistance, seal integrity, heat resistance, and the like, thereby providing high reliability.

In the combined service and parking brake apparatus A of this embodiment, the reservoir 43 is connected to the changeover valve 41, and the reservoir 43 can store brake fluid drained from the control chamber R2 when communication between the main chamber R1 and the control chamber R2 is shut off. Thus, in a condition where communication between the main chamber R1 and the control chamber R2 is shut off by the changeover valve 41, when brake fluid is fed under pressure into the main chamber R1, fluid pressure difference between the main chamber R1 and the control chamber R2 that acts on the second piston 25 can be increased, so that operational response of the second piston 25 can be enhanced. Thus, operational response of the parking brake can be enhanced.

In the above-mentioned embodiment, the internal-thread portion 17c of the cylinder 17a serves as the first stationary screw element; the external-thread portion 25a of the second piston 25 serves as the first movable screw element; the external-thread portion 27a of the threaded shaft 27 serves as the second stationary screw element; and the internal-thread portion 29a of the nut 29 serves as the second movable screw element. However, the external-thread portions and the internal-thread portions can be reversed. In this embodiment, the diameter of the first stationary screw element and the first movable screw element is substantially equal to that of the second screw stationary screw element and the second movable screw element. However, their diameters may differ from each other.

The aforesaid embodiment includes the reservoir 43; however, the present invention may be embodied without use of the component. In an embodiment that does not use the reservoir 43, a function similar to that of the reservoir 43 is effected by means of, for example, expansion of the hydraulic branch line 23b, and the changeover valve 41 assumes the form of an electromagnetic 2-port 2-position on-off valve. The aforesaid embodiment is described while mentioning application of the present invention to a disc brake (a brake whose rotary member to be braked is a disc rotor); however, the present invention may be modified as appropriate and applied to a drum brake (a brake whose rotary member to be braked is a brake drum).

The above-mentioned embodiment employs a single changeover valve 41, which is an electromagnetic 3-port 2-position changeover valve. The changeover valve 41, when de-energized, establishes communication between the main chamber R1 and the control chamber R2, and the changeover valve 41, when energized, shuts off communication between the main chamber R1 and the control chamber R2 and allows flow of brake fluid from the control chamber R2 to the reservoir 43. However, the present invention may be embodied while employing a changeover valve that, when energized, establishes communication between the main chamber R1 and the control chamber R2, and that, when de-energized, shuts off communication between the main chamber R1 and the control chamber R2 and allows flow of brake fluid from the control chamber R2 to the reservoir 43. In these cases, for example, two electromagnetic 2-port 2-position changeover valves may be employed.

In the foregoing embodiment, fluid pressure difference that arises from operation of the changeover valve 41 between the main chamber R1 and the control chamber R2 causes the second piston 25 to move against the second spring 35 along the cylinder axis from its home position to its non-home position. However, the present invention may be embodied such that magnetic force generated from an electromagnetic actuator attached to a cylinder (17a) is used to move a second piston (25) against a second spring (35) along the cylinder axis from its home position to its non-home position.

In the above-mentioned embodiment, when the brake apparatus A is used as a parking brake, the brake fluid pressure control unit CU feeds brake fluid under pressure into the main chamber R1 and the control chamber R2. However, the present invention may be embodied such that when the brake apparatus A is used as a parking brake, the master cylinder MC feeds brake fluid under pressure into the main chamber R1 and the control chamber R2.

What is claimed is:

1. A combined service and parking brake apparatus comprising:
    a piston disposed in a cylinder in such a manner as to be nonrotatable about a cylinder axis and movable along the cylinder axis to thereby form a hydraulic chamber within the cylinder;
    a brake lining to be moved under pressure by the piston and engaged with a rotary member to be braked, when the piston is moved under pressure of brake fluid fed into the hydraulic chamber, thereby effecting a braking operation on the rotary member;
    a movable member provided within the hydraulic chamber in such a manner as to be rotatable about the cylinder axis and movable along the cylinder axis between its home position and its non-home position, movement of the movable member in a piston-returning direction being restricted to the home position, the movable member being urged, by first biasing means, along the cylinder axis from the home position toward the non-home position;
    a first stationary screw element provided integrally with the cylinder within the hydraulic chamber, extending along the cylinder axis, and having a predetermined lead;
    a first movable screw element having a thread surface engaged with a thread surface of the first stationary screw element, provided integrally with the movable member, and meshed with the first stationary screw element with a predetermined thread-to-thread clearance present therebetween along the cylinder axis;
    a second stationary screw element disposed coaxially with the first stationary screw element within the hydraulic chamber, provided integrally with the piston, extending along the cylinder axis, and having a lead shorter than the lead of the first stationary screw element;
    a second movable screw element having a thread surface engaged with a thread surface of the second stationary screw element, provided within the hydraulic chamber in such a manner as to be rotatable about the cylinder axis and movable along the cylinder axis, meshed with the second stationary screw element with a predetermined thread-to-thread clearance present therebetween along the cylinder axis, and urged along the cylinder axis against the first biasing means by second biasing means having biasing force greater than that of the first biasing means;
    a friction clutch capable of engaging the second movable screw element and the movable member with each other and disengaging the second movable screw element and the movable member from each other, the friction clutch being brought in a disengaged condition and allowing relative rotation between the second movable screw element and the movable member at the time of the second movable screw element moving away from the movable member against the second biasing means, and the friction clutch being brought into an engaged condition and restricting relative rotation between the second movable screw element and the movable member at the time of the second movable screw element being urged by the second biasing means and engaging with the movable member; and
    a drive device capable of moving the movable member and the second movable screw element along the cylinder axis against the second biasing means from their respective home positions toward their respective non-home positions.

2. A combined service and parking brake apparatus according to claim 1, wherein the movable member is a second piston disposed within the hydraulic chamber in such a manner as to be rotatable about the cylinder axis and movable along the cylinder axis to thereby divide the hydraulic chamber into a main chamber and a control chamber; and the drive device is a changeover valve provided in the hydraulic branch line allowing feed and drainage of brake fluid therethrough to and from the control chamber and branched from a hydraulic line allowing feed and drainage of brake fluid therethrough to and from the main chamber, the changeover valve being able to establish and shut off communication between the main chamber and the control chamber.

3. A combined service and parking brake apparatus according to claim 2, wherein a reservoir is connected to the changeover valve, and the reservoir can store brake fluid drained from the control chamber when communication between the main chamber and the control chamber is shut off.

* * * * *